April 13, 1943.　　B. E. MORITZ, JR　　2,316,354
GAIN CONTROL
Filed Jan. 18, 1940　　3 Sheets-Sheet 1

INVENTOR
Burt E. Moritz, Junior
BY
Geo. L. Parkhurst
ATTORNEY

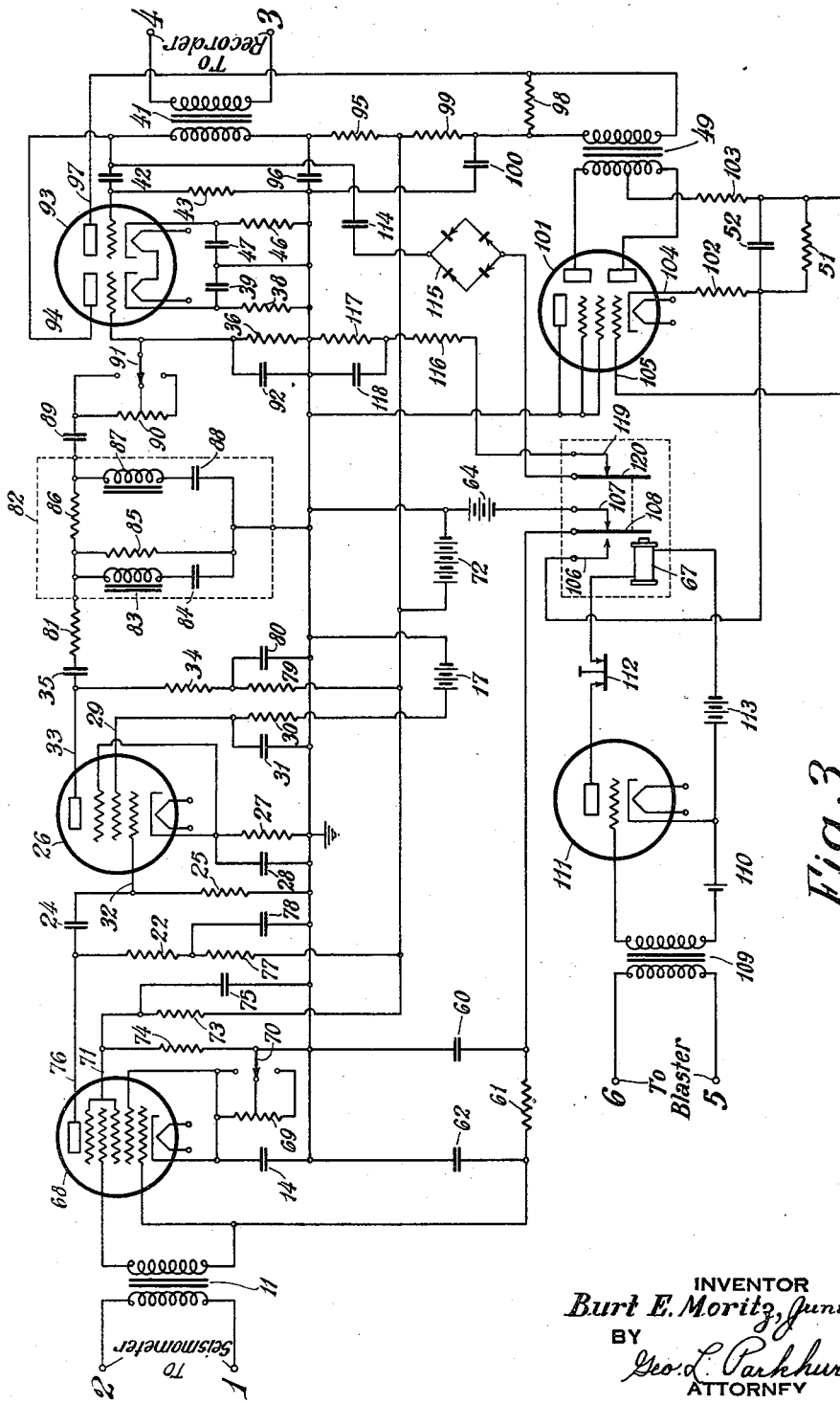

Patented Apr. 13, 1943

2,316,354

UNITED STATES PATENT OFFICE 2,316,354

GAIN CONTROL

Burt E. Moritz, Jr., Houston, Tex., assignor to Stanolind Oil and Gas Company, Tulsa, Okla., a corporation of Delaware Application January 18, 1940, Serial No. 314,503

8 Claims. (Cl. 177—352)

This invention relates to control devices incorporated in thermionic vacuum tube amplifiers. This particular type of controlled amplifier is highly advantageous in the field of seismic geophysical prospecting, but the principles involved are applicable to widely different fields. It will be described in connection with the application to seismic prospecting.

Investigators working in this field have recognized the fact that the amplitudes of the series of related seismic waves received after the detonation of a charge of explosive at a string of detectors placed in the neighborhood of a shotpoint will, in general, decrease rapidly with time. In order to compute the thickness of the weathered layer and for other purposes, it is necessary to obtain the "first breaks" of seismic energy at each instrument, while in order to detect all of the reflected waves it is necessary to record on the same record the later, weaker waves. This imposes very strict requirements upon the types of amplifiers which are used in this connection because the maximum amplification must not only vary according to the spaced relationship of the seismometers with respect to the shot point but the amplifier associated with any seismometer, or group of seismometers, must have a variable gain which in general increases with time after the detonation of the explosive.

In order to satisfy the latter requirement several methods of varying the gain of the seismic amplifiers with time have been proposed. Among these are the use of a variable attenuator which is manually varied with time at the will of the observer, and the use of a control voltage which is applied to one or more grids of variable gain amplifier tubes, either in accordance with a predetermined function of time or in inverse relationship with the amplitude of the recorded signal. All three of these systems have obvious difficulties. The manually operated attenuator system depends for effectiveness upon the skill of a trained observer, and is comparatively useless in unskilled hands. The use of a control voltage which varies as a fixed and invariable function of time is subject to the criticism that it will change the gain of the amplifier according to a predetermined schedule which may not entirely match the variation of the signal amplitude at any one location in the field. The third system which is known loosely as the automatic volume control system is subject to the inherent disadvantage that the amplitude of the control voltage which is applied to correct any variation in signal from a predetermined level is in reality determined by the average signal intensity over a certain length of time so that, if a strong signal is received, it will cause the gain of the amplifier system to be decreased for a considerable period of time so that any weak signal following closely after the strong signal will be recorded with a very low gain and may be entirely overlooked in inspecting the records.

This invention discloses an amplifying system which is not subject to any of the difficulties mentioned immediately above. Accordingly, it is an object of this invention to provide a method of, and devices for, gain control in which the gain of the amplifier is not adjusted manually but automatically, in which the variation of the gain is not a fixed function of the time after the detonation of the explosive, and in which weaker signals following immediately after strong signals will not be recorded with a gain which has been decreased due to the presence of the strong signal. In other words it is an object of this invention to provide a control system for varying the gain of an amplifier by which the gain is automatically increased whenever the output signal level falls below a fixed predetermined value, but in which the gain is not subsequently decreased during the recording period.

It is a further object of this invention to furnish means whereby the operation of the total control is fully automatic after it has been initiated.

A further object is to furnish means whereby this control can be made entirely automatic in that the first response of the seismometer or the firing impulse of the plaster will initiate the system.

Another object of this invention is to provide an amplifying circuit in which the gain of the amplifier may be kept at a predetermined low initial level for a predetermined period of time, after which the gain of the amplifier will increase automatically whenever the output signal level falls below a predetermined amount, but will not decrease below any previous value throughout the recording period.

A further object is to provide a control system such as discussed immediately above, in which the maximum gain of the amplifier or the rate of the application of the control voltage can be varied easily and quickly in the field so that the operation of the control system is rapidly adjustable to meet any sort of field conditions encountered.

This gain control will be described in connection with the following drawings which illustrate certain specific embodiments of the invention and which form part of the specification and are to be read in conjunction with it. In these drawings, like or corresponding reference numerals in different figures refer to the same or corresponding parts.

Figure 3 shows a schematic view of another amplifier of the same general type as shown in Figure 2 but with certain important additions and modifications which have proved advantageous in actual operations.

Figure 1:
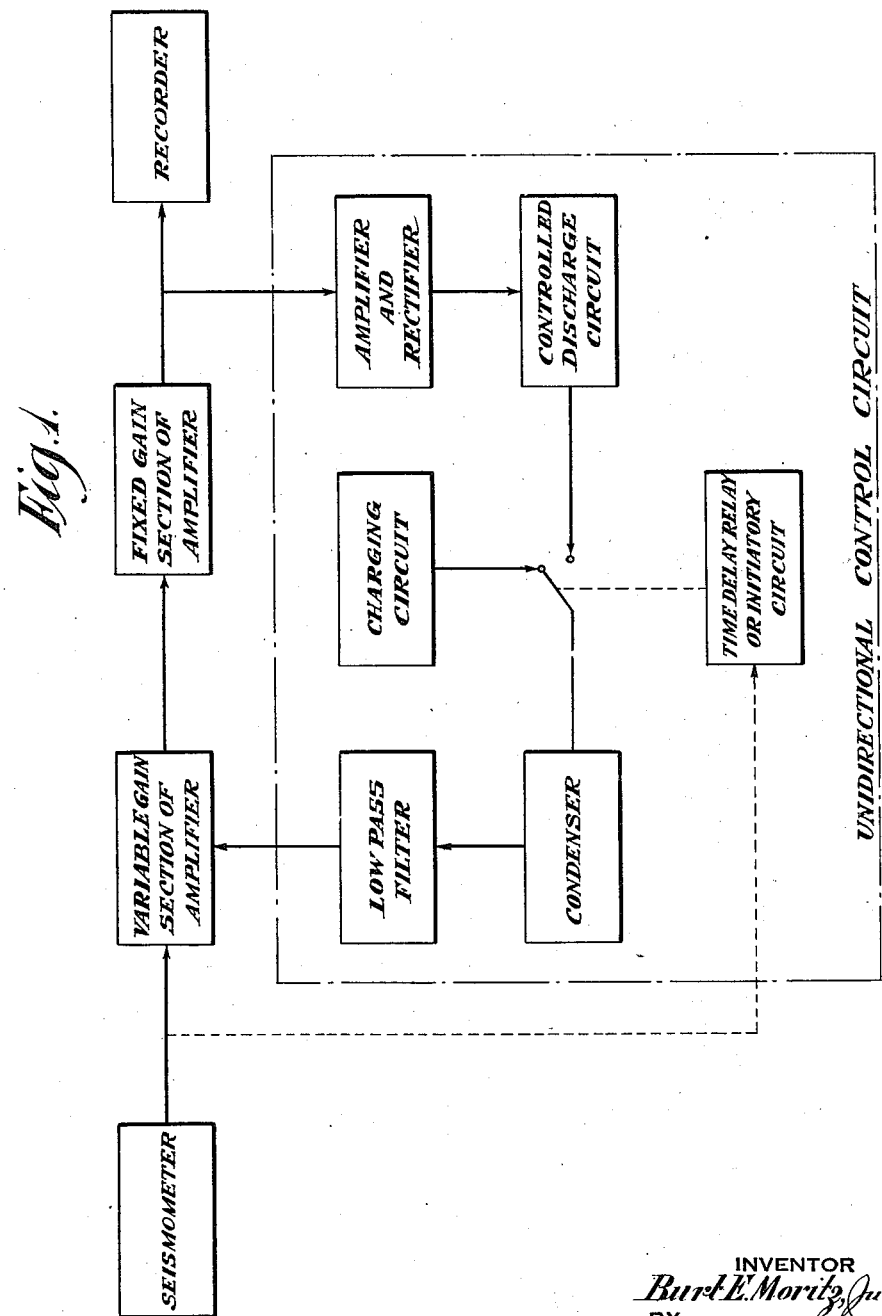
Figure 1 shows in block diagrammatic form the general arrangement of the interdepending parts of the apparatus forming a complete recording system for seismic waves and illustrates the action of the control apparatus.

In Figure 1 there is shown in diagrammatic form the essential elements cooperating to form my invention and also a seismometer and a recorder to complete the entire recording system. Signals generated by seismic waves impinging on the seismometer are conducted to a variable gain section of an amplifier and then to a fixed gain section of the same amplifier where they receive their final amplification and are recorded in the recorder.

From the fixed gain section of the amplifier a signal proportional to the recording signal is taken off, and, if desired, amplified further before passing to a rectifier. The rectified signal is applied to actuate a discharge circuit which is used in conjunction with a condenser. The voltage across the charged condenser is passed through a filter and applied to control the gain in the variable gain section of the amplifier.

Initially the condenser is charged up to a certain predetermined voltage, which voltage establishes the initial gain of the variable gain amplifier section. For a period after the first signals from the seismometer are received, the discharging system for the condenser is inoperative and during this time the amplifier is maintained at the initial minimum gain.

This time is determined by the setting of the time delay relay which is actuated either by the output from the amplifier, or by the time break impulse and which after a certain predetermined time permits the discharge system to become operative. This discharge system is in effect a non-harmonic variable resistance which is shunted across the condenser. The value of this variable resistor depends upon the rectified output of the fixed gain amplifier and is high when strong signals are received and low when weak signals are being recorded. Accordingly the condenser will partially discharge whenever the output of the amplifier falls below a certain predetermined value, at a rate dependent upon the decrease in signal level below this predetermined value. The voltage across the condenser is applied as already mentioned to the gain control grids of the variable gain section in such a manner that as the condenser voltage decreases, the gain increases. There is no provision for recharging the condenser during the recording period. As a consequence of this the gain of the variable gain section of the amplifier will never decrease during the recording period but will increase at a variable rate depending upon the magnitude of the incoming signals. This is the main principle upon which this invention is founded and because of this and for lack of a better term the type of control employed is called a unidirectional control. The elements contributing to the control system proper as distinguished from the amplifier system proper, are enclosed in broken lines in Figure 1, for clarity in illustration.

It may be seen from the above description that the basic object of this invention is accomplished by any type of circuit in which the elements operate in accordance with the functions shown in Figure 1. The variation in gain is entirely automatic and is not dependent upon the attention of the observer. On the other hand the fact that the change in gain is always in the same direction shows that there can be no suppression of a weak signal following a strong signal. At the very worst a weak signal following immediately after a strong signal will be recorded in its true relative amplitude, while if the weak signal follows at some later time it will be amplified to a greater degree and will appear larger than normal in relation to the strong wave. Thus the tendency of the "automatic volume control" type of amplifier to over-control after the passage of a strong signal is eliminated, a point which has proved in practice to be highly advantageous.

Figure 2:
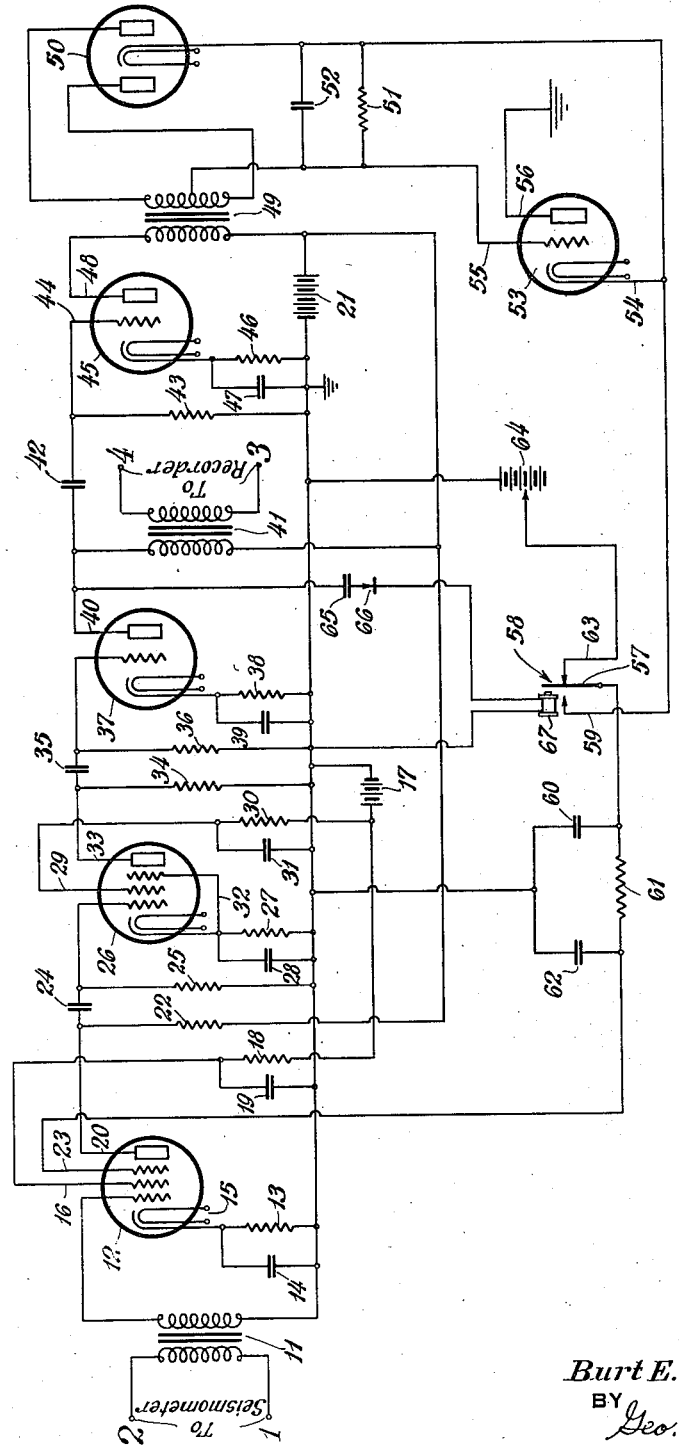
Figure 2 shows a schematic diagram of a complete amplifier channel constructed in accordance with the invention.

Figure 2 shows one type of amplifier built in accordance with the principles of this invention. In Figure 2 the seismometer and recorder have been eliminated but the points at which they are connected with the amplifier are shown respectively as 1 and 2, and 3 and 4. In this figure a seismometer or group of seismometers arranged in any of the methods well known to the art, are connected to the primary of input transformer 11. The secondary of this transformer is connected between the control grid of a pentode type tube 12 and ground. This tube is operated with a cathode bias circuit composed of a resistance 13 and a by-pass condenser 14, and with an indirectly heated cathode. However, a directly heated cathode and a grid bias battery could be used in this circuit if desired. A battery or other source of heating current is connected to the heater 15 of this tube, as well as the heaters of all the other tubes, but as there is no novelty in this feature the battery and connecting wires had been eliminated for the sake of simplicity. The screen grid 16 of this tube is biased positively by a battery 17 which is preferably connected to the screen grid 16 through a simple filter composed of a series resistance 18 and a by-pass condenser 19. Potential for the plate 20 of tube 12 is furnished by a battery 21 through the plate resistance 22. In this particular circuit the gain control voltage is applied to the suppressor grid 23 in a manner which will be subsequently described. In this figure tube 12 and the adjoining coupling circuits constitute the variable gain section of the amplifier.

The variable gain section of the amplifier is shown resistance-capacity coupled to the fixed gain section of the amplifier by means of a coupling condenser 24 and a grid resistor 25. The pentode tube 26 and the circuits associated with it form a normal resistance-capacity coupled amplifier section. The cathode bias circuit is composed of resistance 27 and by-pass condenser 28. The screen grid 29 is biased by battery 17 preferably through a filter composed of a resistance 30 and a by-pass condenser 31. The suppressor grid 32 is connected to the cathode. The plate 33 is resistance-capacity coupled to the succeeding tube by plate resistance 34, coupling condenser 35, the grid resistor 36. The plate 33 is supplied with potential by battery 21. Triode tube 37 is the output tube of the fixed gain section. It is shown with a cathode bias circuit composed of resistance 38 and by-pass condenser 39, and with the plate 40 coupled through the primary of transformer 41 to battery 21. The secondary of the output transformer 21 is connected to a recording element of the recorder. Tubes 26 and 37 and the associated circuit elements form the fixed gain section of the amplifier.

Normally the plate signal of triode 37 is insufficient to operate the rectifying circuit in the unidirectional control. This signal is accordingly amplified by coupling it through condenser 42 and grid resistor 43 to the grid 44 of another triode 45, which may suitably be used with a cathode biasing circuit 46 and by-pass condenser 47. The plate 48 of this triode is coupled to transformer 49 which in turn feeds the full wave rectifier circuit. This last is composed of double diode 50, the plates of which are connected to the opposite ends of the secondary of transformer 49 and the cathode of which is connected through resistance 51 to the center tap of the secondary of transformer 49. A by-pass condenser 52 is connected across resistance 51 to filter out the alternating current components of the rectified voltage. By means of this circuit a direct current is produced across resistance 51 which varies in accordance with the average value of the recorded signal. This voltage is used to control the discharge circuit and the gain control condenser in the following manner.

Triode 53 is operated as a variable resistance. The rectified voltage across resistance 51 is applied between cathode 54 and grid 55 of this tube so that any rectified signal will produce a negative bias on the grid with respect to the cathode. The plate 56 of the triode is grounded. It is well known in the art that the effective resistance between the cathode and plate of a triode depends upon the grid bias and can be varied over an extremely wide range (for example from about 10,000 ohms to several megohms) as the bias is varied from zero to a high negative value. The effective resistance between cathode 54 and plate 56 of triode 53 will vary in accordance with the rectified signal appearing across resistance 51 and will be high when this signal is large and low when this signal disappears.

During the normal operation of the entire amplifier arm 57 of the relay indicated generally as 58, will make contact with contact 59 so that condenser 60, one side of which is grounded, will be connected through the effective resistance of tube 53 to the ground and will accordingly discharge at a rate governed by the capacity of condenser 60 and the resistance of tube 53. The potential across condenser 60 is applied through a filter composed of a series resistance 61 and a shunt condenser 62 to the suppressor grid 23 of variable gain pentode 12. The gain of this tube will vary inversely with the bias on the suppressor grid 23.

Initially arm 57 of relay 58 is connected to contact 63, so that the potential of the gain control battery 64 is applied to charge condenser 60 negatively, with respect to the ground. This negative potential is made sufficiently high so that the initial gain of pentode 12 (which is preferably of the remote cut-off type) is low enough so that the first signals arriving from the seismometer will be amplified to the normal recording amplitude by the time they pass through the secondary of output transformer 41.

In order to actuate the relay 58 the plate signals on tube 37 are applied through coupling condenser 65 and rectifier 66, which is preferably a simple copper oxide rectifier, to the actuating coil 67 of relay 58. By this means a rectified current is applied to this coil 67 which, after the passage of the first few cycles of the incoming signal will be sufficient to throw arm 57 from its initial position in contact with contact 63 to its final position in contact with contact 59. Until this relay operates, the gain of the first tube is held in its initial minimum value and all signals which pass through the amplifier will be amplified to the same amount.

Relay 58 is preferably of the locking type so that once arm 57 is thrown over against the contact 59 the relay arm will not swing back during the recording period but must be reset after the end of the recording period. The circuit constants associated with the relay are so chosen that after a certain predetermined time the relay will operate. After this time, as discussed above, the initial high negative charge across condenser 60 will leak off at a controlled rate to ground through the effective resistance of the triode 53. Since the resistance of this triode will be high whenever the output signals are strong the effective resistance of tube 53 will also be high and there will be practically no change in the potential across condenser 60 and hence practically no change in gain of the pentode 12. However, whenever the signal intensity decreases the resistance of triode 53 will automatically decrease, the voltage across condenser 60 will be lowered and the gain of the pentode 12 will accordingly increase.

Since gain control battery 64 is disconnected from condenser 60 throughout the portion of the recording period after relay 58 has operated, condenser 60 cannot be recharged, the voltage across it can never exceed any previous value and the gain of the variable gain section of the amplifier can never decrease during one recording period.

Figure 3 shows the schematic diagram of another amplifier built according to the invention which has been modified to incorporate a number of features found to be very desirable in field operation. Incoming signals from the seismometer or seismometers are applied as before, to the input of transformer 11 across terminals 1 and 2. In this case an especially advantageous type of tube, a pentagrid converter is used in the variable gain amplifier section. This tube 68, which may preferably be of the 6A8G type, or one with similar electrical characteristics, is operated with the signal applied between the control grid and the mixer grid as will be subsequently described. Preferably this tube is operated with a cathode bias circuit which is composed of by-pass condenser 14 and resistance 69. This resistance is tapped so that it can be used as a variable sensitivity control. When switch 70 is in the lowest position the tube is operated with maximum negative bias and has low gain, while when the switch is in the upper position the tube is operating at high maximum gain. Potential on the screen grid 71 of this tube is obtained from battery 72 through a voltage divider composed of resistances 73 and 74. Resistance 74 is by-passed by condenser 75 for adequate filtering. In a multi-channel amplifier the resistances 74 of the various channels will be adjusted so that all channels will have the same gain for identical biases on the other grids of the pentagrid converter tubes. This feature is desirable to compensate for the non-uniformity of the tubes which in practice is always experienced.

Plate 76 of this variable gain section of the amplifier is resistance-capacity coupled through plate resistance 22, coupling condenser 24, and grid resistance 25 to the first tube of the fixed gain section of the amplifier. A plate filter circuit composed of resistance 77 and by-pass condenser 78 is employed to prevent any possibility of mutual coupling of any stages through the impedance of battery 72.

The signal across grid resistor 25 is impressed on grid 32 of the pentode 26. This tube is operated as a conventional cathode-biased resistance coupled amplifier stage. The cathode bias circuit is composed of resistance 27 and condenser 28. The screen grid of this tube is supplied with potential from battery 17 through a suitable filter composed of resistance 30 and condenser 31. The plate 33 of this tube 26 is connected through plate resistance 34 and filter resistance 79 to battery 72 and, as in the previous stage, a by-pass condenser 80 is employed in conjunction with filter resistance 79. The output of this tube 26 is coupled through coupling condenser 35 and series resistance 81 to a band rejection filter indicated generally as 82. Many types of band rejection filters are known in the art which could be suitably employed here. One particular example is described simply by way of illustration and not by way of limitation. This is a pi-section filter with a shunt arm composed of inductance 83 and condenser 84 across which is placed resistance 85, a series arm made up of resistance 86, and a second shunt arm made up of inductance 87 and condenser 88. This filter section may be tuned to any desirable frequency, for example, it may be tuned to reject 10 cycles, which will minimize the major ground roll components of the incoming signal. It also serves another advantageous purpose which will be later described. Normally several filters having different characteristics will be made up and used interchangeably to vary the overall frequency response curve of the amplifier which in field practice is found to be quite useful. The output of this filter is coupled through condenser 89 to tapped resistance 90, which with grid resistance 36 forms an adjustable volume control. A shunt condenser 92 is placed across grid resistance 36 so that the high frequency components of the incoming signal such as wind noise, etc., are attenuated.

One-half of a double triode tube 93, for example a 6F8G, is used as the output tube of the fixed gain section of the amplifier. The plate 94 of the tube is connected to the primary of output transformer 41, the other side of which is connected through a plate filter made up of a resistance 95 and by-pass condenser 96 to battery 72. The secondary of transformer 41 is connected to one recording element of the recorder.

The signal on the plate 94 of double triode 93 is also impressed upon the second triode grid through coupling condenser 42 and grid resistance 43. The two cathodes of this double triode tube 93 are suitably biased by biasing circuits consisting of resistance 38 and by-pass condenser 39, and resistance 46 and by-pass condenser 47, respectively. The signal on the plate 97 of the second triode section is the signal used to control the condenser discharge system. It is impressed across a plate resistance 98. One side of resistance 98 is connected through a plate filter made up of series resistance 99 and by-pass condenser 100 to battery 72. A transformer 49 with a center tapped secondary, is employed to impress the signal across resistance 98 upon the two diode plates of a double triode-pentode 101, a double diode-triode, or the like. This tube forms the controlled discharge circuit and takes the place of triode 53 and the double diode 50 of Figure 2. I have found that a tube of the 6B7 type used with the pentode connected as a triode, is especially advantageous.

The rectified output of the signal impressed across the secondary of transformer 49 appears across resistors 102, 51, and 103 which are in series between the cathode 104 of tube 101 and the center tap on the secondary of transformer 49. Of this rectified signal the portion appearing across resistance 102 and 51 is used as the bias between cathode 104 and control grid 105 of tube 101. Condenser 52 is shunted across resistance 51 to by-pass the alternating current component of the rectified current which would otherwise appear across this resistance. By a suitable choice of resistors 51 and 103 it is possible to select any arbitrary portion of the total rectified signal for use as a grid bias in tube 101. The screen and suppressor grids of tube 101 are tied to the plate and the combination is grounded.

The junction between resistance 102 and 51 is connected to one fixed contact 106 of a single pole double throw set of relay contacts in the time delay relay. The opposite fixed contact 107 is connected to gain control battery 64. The movable contact 108 is connected to the non-grounded side of condenser 60 which operates in this circuit in exactly the same method outlined in connection with Figure 2. Thus, until the relay coil 67 is energized, condenser 60 is maintained charged to the potential of gain control battery 64 through contacts 107 and 108, and this potential is applied through the low pass filter composed of resistance 61 and shunt condenser 62 to the oscillator and control grids of the variable gain tube 68, maintaining the gain of this tube at its initial low value.

After the relay coil 67 is energized and the time delay relay operates, contact 108 is connected to contact 106 throughout the remainder of the recording period, and as before, condenser 60 is discharged through the effective resistance of the triode-connected section of tube 101. Whenever the output signal is high the rectified voltage across resistances 102 and 51 will be large, the negative bias of grid 105 with respect to cathode 104 will be high, and the effective resistance between the cathode and plate of that tube will be large so that condenser 60 will discharge at a very low rate. A decrease in rectified voltage will accelerate the discharge of condenser 60. Resistance 102 in this circuit is in series with the effective tube resistance and is inserted so that the discharge of condenser 60 will not be too rapid when the effective resistance of tube 101 drops to its minimum value. Accordingly the operation of tube 101 can be considered as that of a noiseless switch grounding one end of resistance 102.

If resistance 102 were not present, the change of gain of tube 68 would be so rapid on occasions that a spurious signal of low frequency would be generated in this tube and recorded. Hence resistance 102 helps prevent such changes. The recording of such signals is also obviated by the use of the low frequency band rejection filter 82. Low frequency oscillation is also prevented by this circuit.

In practice it is found that the effective resistance of tube 101 of the 6B7 type varies from about 20 megohms to about 30,000 ohms for approximately one volt change in grid bias. As discussed above, the point at which this change takes place can be adjusted by varying the relative values of the two resistances 51 and 103. This ratio is adjusted by experiment to give the correct overall record level.

Figure 3 illustrates another type of actuating circuit for the relay coil 67 which differs from that shown in Figure 2 in that the relay is here actuated a certain time after the receipt of the time break impulse from the blaster used to detonate the explosive. In this circuit the primary of transformer 109 is connected to this time break circuit across contacts 5 and 6 so that the voltage generated at the instant the cap wire fuses is impressed across this circuit.

The secondary of transformer 109 is connected in series with a grid bias battery 110 across the cathode and grid of a gaseous discharge tube (Thyratron or grid-glow tube) 111. The plate of this tube is connected through a push-to-open switch 112, through the energizing coil of the time delay relay and through plate battery 113 to the cathode of tube 111. The bias imposed on the grid of tube 111 by the bias battery 110 is adjusted so that, upon receipt of the time break impulse, tube 111 is fired, after which a steady current flows through coil 67 until push button 112 is operated. The magnetic core enclosed by coil 67 is fitted with a heavy copper ring so that a definite predetermined time elapses between the energizing of this coil and the operation of the relay contacts. It is understood of course, that many other types of suitable time delay relay actuating circuits could be used instead of the type described. By use of the initiating circuit shown, or a similar one, the variable gain tube 68 is maintained at its initial low value for a definite predetermined time after the reception of the time break impulse at the recording truck, after which this gain is controlled by the unidirectional control circuit described.

This arrangement has the advantage that there is no need to operate the gain control circuit during the first few hundredths of a second after the initial receipt of seismic waves, so that the control need be effective only over a greatly decreased range. However, during these first few hundredths of a second, waves of greatly varying magnitude are encountered, some of which are often so large in relation to the first wave received that if this first wave is recorded with perceptible amplitude (which is always necessary for certain computations used in determining "weathering" corrections), the later, high amplitude waves will drive the recorder element through undesirably wide swings. In order to limit the possible maximum amplitude of the recording element in this first section of the recording period, it is occasionally advantageous to incorporate in this amplifier a so-called volume limiter circuit. One such possible limiter circuit is shown incorporated in the amplifier shown in Figure 3.

This circuit is essentially composed of a rectifier placed across the primary of the output transformer 41, so arranged that there is effectively no rectification until the signal amplitude increases above a certain predetermined value, after which the rectification increases as the signal intensity increases above this level. By use of this circuit, the peaks of undesirably large amplitude waves are reduced during the period before the control takes hold, so that the waves can be recorded on the limited width of the film allotted each trace.

Referring to Figure 3, a connection is shown from one side of the primary of the output transformer 41 leading to a blocking condenser 114, through a full wave rectifier, preferably of the copper oxide type shown generally as 115, through contacts 119 and 120 of relay 58, through resistance 116, and through a filter circuit composed of resistance 117 and by-pass condenser 118 to ground. The voltage across the primary of output transformer 41 is thus impressed effectively across resistance 116 and copper oxide rectifier 115, in series. The effective resistance of this copper oxide rectifier varies roughly inversely with the applied potential across it, so that until the drop across the rectifier 115 exceeds a certain value there will be very little rectification. After this point is passed, the resistance of the rectifier will decrease, thus lowering the value of the shunt impedance applied across the primary of output transformer 41 and by-passing more and more of the strong signals. Since resistance 116 and rectifier 115 form a voltage divider, it is possible by selecting the impedance of these two elements to cause the by-passing action to occur at any arbitrarily chosen value of output signal strength.

It is desirable to eliminate the rectifier from this shunt circuit, in fact it is desirable to eliminate the shunt circuit entirely after the control circuit has been placed in operation, so that there will be no distortion on the peaks of the recorded waves. It is quite important that minimum distortion occur in order that correlation between different records will be possible. In order to accomplish this, the relay contacts 119 and 120 of the time delay relay are so arranged that as soon as the control circuit is actuated, these contacts open and remove the shunt across the primary of output transformer 41. It is understood that there are numerous other types of volume limiters which could be used instead of the type shown, and that this invention is not to be limited by the use of any particular type of volume limiter circuit.

As has been previously stated, the circuits shown are merely for the purpose of illustration rather than limitation. The invention is best defined and limited by the appended claims.

I claim:

1. In apparatus for seismic surveying comprising a seismometer, an amplifier associated with said seismometer, said amplifier including a variable gain section, and a recorder actuated by said seismometer through said amplifier, the improvement which comprises gain control operative only to increase the gain of said variable gain section of said amplifier, and means responsive to signals passing through said variable gain section of said amplifier for continuously controlling the rate of increase in gain of said gain control.

2. In apparatus for seismic surveying comprising a seismometer, an amplifier associated with said seismometer, said amplifier including a variable gain section, and a recorder actuated by said seismometer through said amplifier, the improvement which comprises a rectifier for a signal which has passed through said variable gain section, and means actuated by said rectifier controlling the gain of said variable gain section of said amplifier whereby the gain of said variable gain section is increased whenever the amplified output of said amplifier decreases below a predetermined value and is maintained substantially constant whenever the output of said amplifier considerably exceeds said predetermined value.

3. Apparatus for seismic surveying comprising a seismometer, an amplifier associated with said seismometer, said amplifier including a variable gain section, a recorder actuated by said seismometer through said amplifier, a rectifier for rectifying a signal which has passed through said variable gain section of said amplifier, and means responsive to the output of said rectifier and acting on said variable gain section of said amplifier to increase the gain of said variable gain section of said amplifier in response to decreases in the strength of said rectified signals while maintaining said gain substantially constant in response to increases in the strength of said rectified signals.

4. Apparatus for seismic surveying comprising a seismometer, an amplifier associated with said seismometer, said amplifier including a variable gain section, a recorder actuated by said seismometer through said amplifier, means responsive to the amplitude of signals which have passed through said variable gain section of said amplifier for varying the gain of said variable gain section of said amplifier solely in the direction of increasing gain at a decreasing rate as said amplitude of said signals increases, and means for initiating the action of said last-mentioned means at an interval of time after the first arrival of said signals at said amplifier.

5. Apparatus for seismic surveying comprising means for generating seismic waves, a seismometer, an amplifier associated with said seismometer, said amplified including a variable gain section, a recorder actuated by said seismometer through said amplifier, means for changing the gain of said variable gain section of said amplifier solely in the direction of increasing gain, means responsive to the average amplitude of the signals passing the output of said amplifier for varying the rate of change of said variation in gain, and means responsive to the operation of said first-mentioned means and operative a predetermined time after the operation of said first-mentioned means for initiating the action of said last-mentioned means at a time interval after the arrival of the first of said signals at said amplifier.

6. In a method of seismic surveying comprising receiving seismic waves and converting them into corresponding electrical signals, variably amplifying said electrical signals, and recording said amplified signals, the improvement which comprises automatically increasing said variable amplification from time to time during at least a part of the seismic surveying operation in response to decreases in the strength of said variably amplified signals while maintaining the change in said amplification substantially zero during increases in the strength of said variably amplified signals.

7. In a method of seismic surveying comprising receiving seismic waves, and converting them into corresponding electrical signals, amplifying said electrical signals, and recording said amplified signals, the improvement which comprises maintaining the amplification constant during the first part of a seismic surveying operation and thereafter continuously and automatically increasing said amplification in response to the strength of said amplified signals at a rate varying approximately inversely with the strength of said amplified signals.

8. A method of amplifying a series of seismic detector signals which comprises amplifying signals by a vacuum tube amplifier circuit having a portion of such character that application of a decreasing control bias thereto increases the amplification gain, applying a progressively decreasing bias to said portion of the circuit whereby gain progressively increases with time, and arresting the decrease in bias upon appearance of amplified signal energy above a predetermined amplitude corresponding to a signal amplitude level above which signals cannot usefully be recorded.

BURT E. MORITZ, Junior.